United States Patent [19]

Yanik et al.

[11] 4,355,157

[45] Oct. 19, 1982

[54] HOT WATER PRECIPITATION OF RESINS CONTAINING MALEIC ANHYDRIDE

[75] Inventors: Richard W. Yanik, Twinsburg; Albert J. Herold, Bedford, both of Ohio

[73] Assignee: The Standard Oil Company, Cleveland, Ohio

[21] Appl. No.: 218,654

[22] Filed: Dec. 22, 1980

[51] Int. Cl.$^3$ ............................................. C08F 6/12
[52] U.S. Cl. ................................... 528/499; 528/496; 528/502
[58] Field of Search ............... 528/499, 498, 497, 493, 528/502

[56] References Cited

U.S. PATENT DOCUMENTS

| | | | |
|---|---|---|---|
| 3,041,318 | 6/1962 | Hess | 528/493 X |
| 3,461,108 | 8/1969 | Hellman et al. | 526/272 |
| 3,646,044 | 2/1972 | Sekmakas | 260/296 H |
| 3,706,704 | 12/1972 | Heilman | 526/272 X |
| 3,729,450 | 4/1973 | Galiano et al. | 528/500 |
| 3,972,903 | 8/1976 | Gross | 526/272 X |
| 4,038,477 | 7/1977 | Inoue | 528/487 |
| 4,137,281 | 1/1979 | Li et al. | 260/878 R |
| 4,145,375 | 3/1979 | Cutter et al. | 526/272 |
| 4,147,852 | 4/1979 | Bozzelli et al. | 526/272 |

FOREIGN PATENT DOCUMENTS

| | | |
|---|---|---|
| 757163 | 10/1969 | Belgium . |
| 7030828R | 6/1967 | Japan . |
| 7333638R | 3/1970 | Japan . |
| 5476690 | 11/1977 | Japan . |
| 258586 | 11/1967 | U.S.S.R. |
| 622819 | 5/1976 | U.S.S.R. |

*Primary Examiner*—C. A. Henderson
*Attorney, Agent, or Firm*—William D. Mooney; Herbert D. Knudsen; Larry W. Evans

[57] ABSTRACT

A method of precipitating a copolymer comprising maleic anhydride from a solution comprising an organic solvent, the method comprising mixing a solution of an organic solvent and a copolymer of maleic anhydride and a monomer copolymerizable therewith with hot water and agitating the resulting mixture for a sufficient period of time and at a sufficiently high shear rate to yield precipitated particles of said copolymer that are substantially free of internal organic solvent.

7 Claims, No Drawings

HOT WATER PRECIPITATION OF RESINS CONTAINING MALEIC ANHYDRIDE

TECHNICAL FIELD

This invention relates generally to the polymerization of resins containing maleic anhydride. More particularly, this invention relates to a process for precipitating resins containing maleic anhydride from organic solvent solutions.

BACKGROUND OF THE INVENTION

The preparation of copolymers of maleic anhydride with various unsaturated monomers, particularly ethylene and styrene, is well known in the art. One of the more common techniques for effecting the polymerization of such copolymers involves solution polymerization. Briefly, solution polymerization is a process in which the monomers and polymerization initiators are dissolved in a solvent or diluent at the beginning of the polymerization reaction; the solvent or diluent is usually also a solvent for the resulting copolymer. A problem that has persisted in the art is the development of a suitable method for precipitating the polymerized product from the polymerization solution. One commonly used technique is to precipitate the polymer in methanol. This technique has several disadvantages relating to the toxicity, flammability and cost of methanol. Additionally the resin produced using methanol generally has a fibrous texture, low bulk density and often exhibits handling problems such as, for example, bridging the extruder hoppers during pelletizing. Consequently, considerable effort has been expended to devise suitable and effective techniques for precipitating copolymers of maleic anhydride from polymerization solutions.

For example, U.S. Pat. No. 3,461,108 teaches the employment of certain solvents for the polymerization step, keeping the monomers and in some instances the polymers also in solution during polymerization and then adding to the resulting solution another liquid, which causes precipitation of the polymer products in finely divided filterable solid form. The selection of the combination of reaction solvent and precipitating solvent has been characterized as being critical; a limited choice of solvent combination appears to exist and no completely satisfactory precipitating solvent has been found for some copolymers (U.S. Pat. No. 3,729,450). Furthermore, the solvents tend to be costly and, therefore, must be separated and recovered. An alternate approach is disclosed in U.S. Pat. No. 3,729,450 wherein copolymers containing maleic anhydride are copolymerized in a solvent for both monomers and the resulting copolymers. The copolymer products are then recovered by steam distillation until solvent and other liquid materials are removed, leaving a molten copolymer which is then poured on a chilled metal surface to solidify the polymer. The disclosure indicates that the steam stripped copolymers are non-tacky and brittle so that they can be removed from the metal surface and broken into chunks by bending or inverting the chilled surface and allowing the solid material to fall a substantial distance into a container.

U.S. Pat. No. 4,145,375 teaches a process for copolymerizing styrene and maleic anhydride by the steps of gradually mixing maleic anhydride with styrene in a mass stage under polymerizing conditions to form styrene-maleic anhydride polymer and then suspending the styrene-rich mixture in water, the styrene polymerization is completed as in a conventional mass/suspension polymerization system. Following polymerization, polymeric beads are separated from the water and dried. The disclosure indicates that after drying, the beads are likely to contain internal moisture and in addition approximately 15% of the bound maleic anhydride may be present in the acid rather than anhydride form, and, consequently, during extrusion, the acid portion reverts to the anhydride with the elimination of water. The disclosure indicates that a well-vented extruder is needed to produce a bubble-free extrudate.

U.S. Pat. No. 3,646,044 discloses a process wherein maleic anhydride and a vinyl monomer, such as styrene, are copolymerized in an aqueous medium containing a water-miscible organic solvent and a free radical polymerization catalyst so that polymerization takes place in the aqueous medium and an acid copolymer precipitates as it is formed. The water miscible organic solvent becomes associated with the acid copolymer and settles therewith to form a separate, usually gummy, layer at the bottom. An upper aqueous layer is formed which contains very little resin solids.

The methods heretofore known for precipitating polymeric resins containing maleic anhydride from solution polymerization solvents are not comparably facile when compared to the process of the present invention. Likewise, the polymeric products obtained therefrom are attendant with problems not present in the products produced in accordance with the present invention. For example, the problems of selecting nonsolvent materials that are suitable for the particular polymeric material to be precipitated that may, in any event, be toxic, flammable and/or costly are avoided with the present invention. Similarly, the problems of condensing and recovering distilled solvents are also avoided. The products obtained with most of the prior art methods exhibit handling problems (e.g., bridging in extruder hoppers) and processing problems (e.g., foamed extrudate products) that are substantially avoided with the present invention; the prior art methods require additional processing (e.g., heat treating) to overcome these problems that can be avoided or minimized with the present invention.

SUMMARY OF THE INVENTION

The present invention contemplates the provision of a method of precipitating a copolymer comprising maleic anhydride from a solution comprising an organic solvent, the method comprising mixing a solution of an organic solvent and a copolymer of maleic anhydride and a monomer copolymerizable therewith with water at a temperature in the range of about 40° C. to about 100° C. and agitating the resulting mixture for a sufficient period of time and at a sufficiently high shear rate to precipitate particles of said copolymer that are substantially free of internal organic solvent. In a preferred embodiment of the invention, the maleic anhydride containing copolymer is constituted of maleic anhydride and styrene.

DESCRIPTION OF THE PREFERRED EMBODIMENTS

Further features and advantages of the invention will be apparent from the detailed description of the preferred embodiment herein set forth.

The present invention will be described hereinafter as applied particularly to copolymers of maleic anhydride and styrene. It is to be understood, however, that the starting material of the process of the present invention (i.e., the polymeric material to be precipitated) may be any copolymer containing maleic anhydride. The maleic anhydride copolymers useful with the process of the present invention are constituted of maleic anhydride and a monomer copolymerizable therewith. Maleic anhydride monomers include maleic anhydride, monochloromaleic anhydride and bromomaleic anhydride. The amount of maleic anhydride type monomer can vary widely from about 6% to about 50% (molar percent) based on the total polymer composition. Preferably the copolymers of the present invention contain about 40% to about 50% maleic anhydride.

The monomers copolymerizable with maleic anhydride include one or more of indene, isobutylene, diisobutylene, styrene, acrylates such as methylacrylate and methyl methacrylate, alpha-olefins and vinyl acetate. The preferred copolymer is styrene/maleic anhydride wherein up to about 80% of the styrene can be replaced by one or more of the monomers listed above. Copolymers of styrene/maleic anhydride (1:1 molar ratio) and styrene/maleic anhydride/isobutylene (0.5:1:0.5 molar ratio) are particularly preferred.

The process of the present invention is particularly suited for use with polymerization processes employing solution polymerization techniques. Solution polymerization techniques are well known to those of ordinary skill in the art and, consequently, need not be further described herein. A preferred solution polymerization technique that may be used in accordance with the present invention is to effect polymerization in an organic solvent in the presence of a free radical initiator and in the substantial absence of molecular oxygen at a temperature from about 0° C. to about 100° C. Suitable solvents include methyl ethyl ketone, acetone, acetonitrile, toluene and benzene. Methyl ethyl ketone is a preferred solvent.

In accordance with the process of the present invention, the copolymerized starting material is precipitated from the organic solvent employed during polymerization by mixing the solution of solvent and starting material with hot water under high shear agitation. The term "hot water" is used herein to mean water having a temperature in the range of about 40° C. to about 100° C., preferably about 50° C. to about 60° C. The ratio of water to solution containing copolymerized starting material is in the range of about 20:1 to about 1:1, and preferably is about 4:1. Ratios less than about 1:1 generally require agitation at shear rates that are too high to be practical. The precipitation step is performed in a vessel of any type equipped with an agitator that is suitable for effecting high shear mixing of water and solutions containing copolymerized starting material. Such vessels and agitators are entirely conventional in structure and operation and, being well known to those of ordinary skill in the art, need not be further described herein. In a preferred aspect of the invention, baffles are not used to assist agitation due to the fact that polymer tends to build up on the sides of such baffles. When baffles are not used, agitation is preferably performed at a sufficiently high rate so that a vortex is formed, i.e., the fluid level in the vessel increases along a radius from a minimum at the agitator to a maximum at the walls of the vessel.

While not wishing to be bound by theory, it is believed that as the polymerized starting material contacts the hot water, strands or lumps of copolymer are formed with the exteriors of such strands or lumps being softened by the heat from the hot water, the interiors of such strands or lumps containing solvent. High shear agitation continually reduces these strands or lumps to particles ranging in size of up to about ⅛ inch in diameter. The agitation continually exposes the interiors of these strands or lumps to the hot water resulting in the softening of the polymerized material and removal of interior solvent. The softening of the polymerized material provides for a granular exterior appearance and a higher bulk density than would be obtained with colder temperatures. Low shear agitation, on the other hand, results in the formation of large particles that contain substantial quantities of interior solvent which, if not removed, cause foaming during extrusion.

The organic solvent solution containing the starting material can be mixed with the hot water prior to the commencement of agitation or during agitation. The precipitation process of the present invention can be employed with both batch and continuous solution polymerization processes. In either case the operating parameters of the precipitation process must be established within the foregoing limitations to accommodate the operating conditions of the particular polymerization process with which it is to be used.

Upon completion of the precipitation process, the polymerized starting material is separated from the solvent and hot water using conventional filtration techniques and then dried using conventional drying techniques. Such filtration and drying techniques are well known to those of ordinary skill in the art and, consequently, need not be further described herein.

The filtered and dried resinous product produced in accordance with the present invention exhibits a granular appearance, the particle size of wich may range from, for example, a fine powder to nuggets approximately ⅛" in diameter. The material is characterized by a relatively high bulk density which enhances its handling characteristics. Resins produced in accordance with the present invention generally can be fed to an extruder or other processing equipment without the necessity of employing forced feeding techniques. Additionally, filtered and dried granules produced in accordance with the invention are substantially free of internal solvent and, accordingly, are well suited for extrusion and molding applications for producing polymeric articles that are substantially free of bubbles or foam.

The polymeric materials produced in accordance with the present invention can be molded, for example, into containers, pipes, rods, films, sheets, fibers, and the like, to be used for storing and for transporting solids, liquid and gases of various types.

By further illustration of the invention, reference may be made to the following specific examples. Unless otherwise indicated, all parts and percentages are by weight.

EXAMPLE 1

A solution containing a copolymer of maleic anhydride and styrene is prepared from 50 parts by weight of styrene, 50 parts by weight of maleic anhydride, 242 parts by weight of methyl ethyl ketone and 0.5 parts by weight of Vazo-64 (azobisisobutyronitrile, a free radical initiator made by DuPont) using the following procedure. The reaction kettle is placed in a heating mantle and equipped with a stirrer and condenser. One-third of the total charge of the methyl ethyl ketone and Vazo-64 are added to this kettle. The resulting solution is heated with stirring to 80° C. After a few minutes, the feed, made up by dissolving the styrene and maleic anhydride monomers in the remainder of the methyl ethyl ketone, is pumped continuously into the kettle over three hours. The remaining Vazo-64 is added in two equal amounts of the reaction mixture during the monomer addition. The first Vazo-64 addition is made after one hour into the run and the second after two hours into the run. On completion of the feed addition, the reaction mixture is heated and stirred for an extra hour. The resulting solution is then cooled to room temperature.

EXAMPLE 2

One quart of water having a temperature of 50° C. is added to a Model S-61643 Waring Blendor. The Waring Blendor has a one-gallon mixing capacity and three operating speeds. The impeller is driven by a series wound A.C. motor at no load speeds of 15,500, 18,300 and 20,000 rpm. One-half pint of the solution from Example 1 is added to the blender. The blender is turned on initially at high speed for 30 seconds. The speed is then reduced to medium speed and the mixing is continued for another 30 seconds. A vortex is observed during mixing. The product obtained is vacuum filtered for 5 minutes and returned to the Waring Blendor for washing. One quart of tap water is mixed with the product for two minutes at medium speed. The product is filtered and vacuum dried for 15 minutes and then placed in an oven and dried overnight at 55° to 60° C. The product is heat treated at 160° C. for 7 hours then dried overnight at 55° to 60° C. with dehumidified air. The resulting resinous product has a granular appearance ranging in particle size from a fine powder to nuggets approximately ⅛ inch in diameter.

The resulting product is then extruded in a Brabender extruder at 50 rpm using a two-stage vented screw at a temperature of 240° C. A torque of 3,000 meter-grams, an output of 766 grams per hour and a melt temperature of 261° C. is observed. The resin is self-feeding and the extrudate is substantially bubble and foam free.

EXAMPLE 3

The procedure followed in Example 2 is repeated with the exception that the resin is precipitated in water at a temperature of 18° C. The resulting product is a fluffy powder. When extruded in a Brabender extruder under the conditions used in Example 2, a torque of 5500 meter-grams and a melt temperature of 252° C. is observed. Forced feeding is required to feed the resin to the extruder. Significant foaming in the extrudate is observed.

EXAMPLE 4

The procedure of Example 2 is repeated with the exception that the resin is precipitated in methanol at room temperature. The resinous product is observed to have a fibrous texture. The resin is extruded in the Brabender extruder in the same manner as in Example 2 with the result being a torque of 5500 meter-grams and a melt temperature of 258° C. Forced feeding is required to feed the resin to the extruder. Significant foaming in the extrudate is observed.

A comparison of Examples 2, 3 and 4 indicates that a resinous product with acceptable handling and processing characteristics can be obtained when it is precipitated in accordance with the present invention in hot water, but not in water at a temperature of 18° C. and not in methanol. As advantage of the present invention is that the disadvantages of flammability, toxicity and cost associated with using methanol, as well as other non-solvents, are avoided.

While the invention has been explained in relation to its preferred embodiment, it is to be understood that various modifications thereof will become apparent to those skilled in the art upon reading this specification. Therefore, it is to be understood that the invention disclosed herein is intended to cover such modifications as fall within the scope of the appended claims.

We claim:

1. A method of precipitating a copolymer comprising maleic anhydride from a solution comprising an organic solvent selected from the group consisting of methyl ethyl ketone, acetone, acetonitrile, toluene and benzene, the method comprising mixing a solution of said organic solvent and a copolymer of maleic anhydride and a monomer copolymerizable therewith with hot water, the temperature of said hot water being in the range of about 40° C. to about 100° C., and agitating the resulting mixture for a sufficient period of time and at a sufficiently high shear rate to yield precipitated particles of said copolymer that are substantially free of internal organic solvent.

2. The method of claim 1 wherein said copolymer consists of maleic anhydride and styrene.

3. The method of claim 1 wherein said copolymer consists of maleic anhydride, styrene and isobutylene.

4. The method of claim 1 wherein said water temperature is in the range of about 50° C. to about 60° C.

5. The method of claim 1 wherein said copolymer has a maleic anhydride content of from about 6% to about 50% molar weight.

6. The method of claim 1 wherein the ratio of water to solution is in the range of about 1:1 to about 20:1.

7. The method of claim 6 wherein the ratio of water to solution is about 4:1.

* * * * *